(12) United States Patent
Vignon et al.

(10) Patent No.: US 8,063,903 B2
(45) Date of Patent: Nov. 22, 2011

(54) EDGE EVALUATION TECHNIQUES FOR GRAPHICS HARDWARE

(75) Inventors: Blaise A. Vignon, Stanford, CA (US); Franklin C. Crow, Portola Valley, CA (US)

(73) Assignee: NVIDIA Corporation, Santa Clara, CA (US)

( * ) Notice: Subject to any disclaimer, the term of this patent is extended or adjusted under 35 U.S.C. 154(b) by 796 days.

(21) Appl. No.: 12/002,564

(22) Filed: Dec. 17, 2007

(65) Prior Publication Data

US 2009/0122083 A1 May 14, 2009

Related U.S. Application Data

(60) Provisional application No. 61/002,644, filed on Nov. 9, 2007.

(51) Int. Cl.
*G06T 17/00* (2006.01)
(52) U.S. Cl. ........ 345/428; 345/427; 345/421; 345/611; 345/613; 345/506; 345/441; 345/442; 345/443
(58) Field of Classification Search .......... 345/418–428, 345/440–442, 611
See application file for complete search history.

(56) References Cited

U.S. PATENT DOCUMENTS

| | | | |
|---|---|---|---|
| 5,452,412 A | 9/1995 | Johnson, Jr. et al. | |
| 5,594,854 A | 1/1997 | Baldwin et al. | |
| 5,623,692 A | 4/1997 | Priem et al. | |
| 5,664,162 A | 9/1997 | Dye | |
| 5,854,631 A | 12/1998 | Akeley et al. | |
| 5,854,637 A | 12/1998 | Sturges | |
| 5,977,987 A | 11/1999 | Duluk, Jr. | |
| 6,028,608 A | 2/2000 | Jenkins | |
| 6,072,500 A | 6/2000 | Foran et al. | |
| 6,104,407 A * | 8/2000 | Aleksic et al. | 345/428 |
| 6,104,417 A | 8/2000 | Nielsen et al. | |
| 6,115,049 A | 9/2000 | Winner et al. | |
| 6,118,394 A | 9/2000 | Onaya | |
| 6,128,000 A | 10/2000 | Jouppi et al. | |
| 6,137,918 A | 10/2000 | Harrington et al. | |
| 6,201,545 B1 * | 3/2001 | Wong et al. | 345/428 |
| 6,204,859 B1 | 3/2001 | Jouppi et al. | |
| 6,219,070 B1 * | 4/2001 | Baker et al. | 345/475 |
| 6,249,853 B1 | 6/2001 | Porterfield | |
| 6,359,623 B1 | 3/2002 | Larson | |
| 6,362,819 B1 | 3/2002 | Dalal et al. | |
| 6,366,289 B1 | 4/2002 | Johns | |
| 6,429,877 B1 | 8/2002 | Stroyan | |
| 6,437,780 B1 | 8/2002 | Baltaretu et al. | |
| 6,452,595 B1 | 9/2002 | Montrym et al. | |
| 6,469,707 B1 | 10/2002 | Voorhies | |
| 6,480,205 B1 | 11/2002 | Greene et al. | |
| 6,504,542 B1 * | 1/2003 | Voorhies et al. | 345/441 |
| 6,529,207 B1 | 3/2003 | Landau et al. | |
| 6,614,444 B1 | 9/2003 | Duluk, Jr. et al. | |
| 6,624,823 B2 * | 9/2003 | Deering | 345/613 |
| 6,633,197 B1 | 10/2003 | Sutardja | |
| 6,633,297 B2 | 10/2003 | McCormack et al. | |

(Continued)

*Primary Examiner* — Jin-Cheng Wang

(57) ABSTRACT

The edge evaluation technique, in accordance with one embodiment of the present technology, includes determining a number of edges of a given primitive to be evaluated. The technique also includes sequencing evaluation of a first edge by a first edge evaluation circuit and a second edge by a second edge evaluation circuit during a first clock cycle. The technique further includes sequencing evaluation of a third edge by the first edge evaluation circuit and a fourth edge by the second edge evaluation circuit during a second clock cycle if three or more edges are to be evaluated.

17 Claims, 7 Drawing Sheets

U.S. PATENT DOCUMENTS

| | | |
|---|---|---|
| 6,646,639 B1 | 11/2003 | Greene et al. |
| 6,717,576 B1 | 4/2004 | Duluk, Jr. et al. |
| 6,717,578 B1 | 4/2004 | Deering |
| 6,734,861 B1 | 5/2004 | Van Dyke et al. |
| 6,741,247 B1 * | 5/2004 | Fenney ............... 345/421 |
| 6,765,575 B1 | 7/2004 | Voorhies et al. |
| 6,778,177 B1 * | 8/2004 | Furtner ............... 345/544 |
| 6,798,410 B1 * | 9/2004 | Redshaw et al. ...... 345/427 |
| 6,833,835 B1 | 12/2004 | van Vugt |
| 6,947,057 B2 | 9/2005 | Nelson et al. |
| 7,064,771 B1 | 6/2006 | Jouppi et al. |
| 7,119,809 B1 * | 10/2006 | McCabe ............... 345/506 |
| 7,158,148 B2 | 1/2007 | Toji et al. |
| 7,382,368 B1 | 6/2008 | Molnar et al. |
| 7,551,174 B2 * | 6/2009 | Iourcha et al. ........ 345/443 |
| 7,791,617 B2 | 9/2010 | Crow et al. |
| 2002/0050979 A1 * | 5/2002 | Oberoi et al. ......... 345/157 |
| 2002/0097241 A1 | 7/2002 | McCormack et al. |
| 2002/0140655 A1 | 10/2002 | Liang et al. |
| 2003/0122815 A1 | 7/2003 | Deering |
| 2004/0246251 A1 | 12/2004 | Fenney et al. |
| 2005/0030314 A1 | 2/2005 | Dawson |
| 2005/0041037 A1 | 2/2005 | Dawson |
| 2005/0134603 A1 * | 6/2005 | Iourcha et al. ........ 345/611 |
| 2005/0179698 A1 | 8/2005 | Vijayakumar et al. |
| 2005/0259100 A1 * | 11/2005 | Teruyama ............. 345/418 |
| 2006/0170690 A1 | 8/2006 | Leather |
| 2007/0139440 A1 | 6/2007 | Crow et al. |

* cited by examiner

EDGE EVALUATION TECHNIQUES FOR GRAPHICS HARDWARE

CROSS-REFERENCE TO RELATED APPLICATIONS

This application claims the benefit of U.S. Provisional Patent Application 61/002,644 filed Nov. 9, 2007.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system determines whether or not to "render," or write a given pixel into a frame buffer or pixel map, as per the contribution of the primitive. This, in turn, determines how to write the data to the display buffer representing each pixel.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

FIG. 1 shows an exemplary implementation of graphics processing unit (GPU) 100. The process performed by the GPU generally includes setting up a polygon model (e.g., a plurality of primitives) of objects, applying linear transformation to each primitive, culling back facing primitives, clipping the primitives against a view volume, rasterizing the primitives to a pixel coordinate set, shading/lighting the individual pixels using interpolated or incremental shading techniques, and the like. Accordingly, the GPU 100 hardware includes a setup engine 110, a raster pipeline 120, a shading pipeline 130, a data write unit 140, and one or more other units.

The raster pipeline 120 typically includes a rasterizer 122, an edge evaluator 124 and one or more other circuits. The edge evaluator 124 computes the edge equation, $Ax+By+C>0$, for all samples, x and y, and all edges of each primitive. The primitive may include any number of edges. In an exemplary implementation the primitives may have four edges. Therefore, the exemplary edge evaluator 124 includes four edge evaluation circuits 210-240 arranged in parallel, as illustrated in FIG. 2. The edge evaluation circuits 210-240 each evaluate a given edge by computing the edge equation for all samples of an evaluation tile. For a four edge primitive evaluated for a two-by-two tile, the conventional edge evaluator 124 evaluates 16 samples per clock, which amounts to a significant area.

SUMMARY OF THE INVENTION

As computers continue to advance there is a continuing need for improvements in the graphics processing unit. Embodiments of the present technology are directed toward edge evaluation techniques for graphics hardware. In one embodiment a graphics processing unit includes two edge evaluation circuits and a sequencer. The two edge evaluation circuits are coupled, in parallel with each other, to the sequencer. The sequencer inputs a first edge to a first of the two edge evaluation circuits and a second edge to a second of the two edge evaluation circuits, and if more than two edges are to be evaluated inputs a third edge to the first of the two edge evaluation circuits and a forth edge to the second of the two edge evaluation circuits.

In another embodiment, an edge evaluation method includes determining a number of edges of a given primitive to be evaluated. The method also includes evaluating the first edge by a first edge evaluation circuit and the second edge by a second edge evaluation circuit during a first clock cycle and the third edge by the first edge evaluation circuit and the fourth edge by the second edge evaluation circuit during a second clock cycle, if three or more edges are to be evaluated. The method further includes evaluating a first edge by a first edge evaluation circuit and a second edge by a second edge evaluation circuit during a first clock cycle, if two or less edges are to be evaluated.

Embodiments of the present technology advantageously reduce the number of edge evaluators by almost half while incurring substantially less than half the slow down. The edge evaluator containing two edge evaluation circuits in accordance with embodiment of the present technology also consumes less power than conventional edge evaluators containing four edge evaluation circuits.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Figure 3:
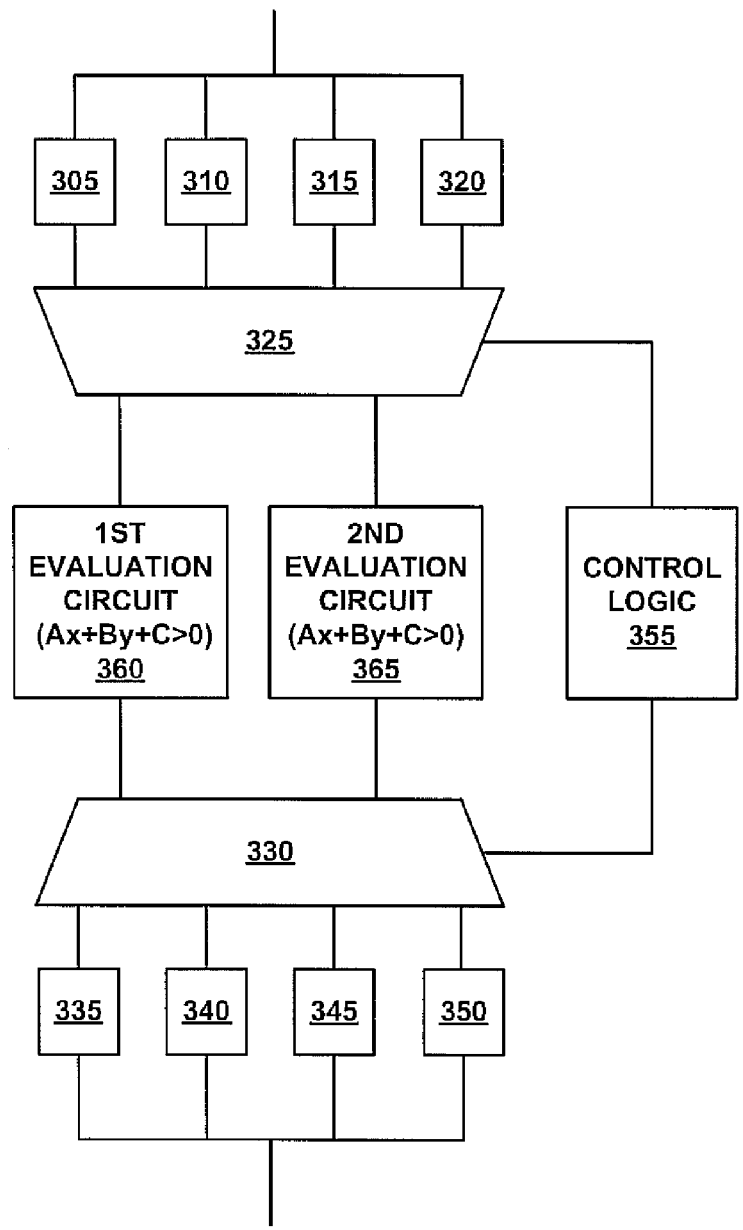
FIG. 3 shows a block diagram of an edge evaluator, in accordance with one embodiment of the present technology.

FIG. 3 shows an edge evaluator 300, in accordance with one embodiment of the present technology. The edge evaluator includes sequencer logic 305-355 and two edge evaluation circuits 360, 365. The two edge evaluation circuits 360, 365 are coupled, in parallel with each other, to the sequencer logic 305-355. The sequencer logic 305-355 may include input buffers 305-320, one or more multiplexers/demultiplexers 325, 330, output buffers 335-350 and other control logic 355. Each edge evaluation circuit 360, 365 includes a plurality of adder circuits, registers and shift logic, to implement the addition and multiplication functions of the edge equation. Thus, each edge evaluation circuit 360, 365 is a relatively large circuit. In particular, the edge evaluation circuits 360, 365 are substantially larger than the sequencer logic 305-355.

When the primitive includes four edges, the sequencer logic 305-355 inputs a first edge to the first edge evaluation circuit 360 and a second edge to the second edge evaluation circuit 365 during a first clock cycle. The sequencer logic 305-355 then inputs a third edge to the first edge evaluation circuit 360 and a fourth edge to the second edge evaluation circuit 365 during a second clock cycle. When the primitive includes three edges, the sequencer logic 305-355 inputs the first edge to the first edge evaluation circuit 360 and the second edge to the second edge evaluation circuit 365 during the first clock cycle. The sequencer logic 305-355 then inputs the third edge to the first edge evaluation circuit 360 during the second clock cycle. When the primitive includes two edges or where all but two edges are trivially already known, the sequencer logic 305-355 inputs a first edge to the first edge evaluation circuit 360 and a second edge to the second edge evaluation circuit 365 during a first clock cycle. The second clock cycle may then be used to begin evaluating the next primitive.

The two edge evaluation circuits 360, 365 used over two cycles do not appreciably reduce performance of the GPU because the evaluation of relatively small primitives is in fact limited in speed by other stages in the raster pipeline and/or other units in the GPU. For example, the setup unit requires two clock cycles to setup each primitive. Therefore, edge evaluation of the primitives over two clock cycles does not add to processing latency because of the bottleneck at the setup unit. Other units, such as the shader, are also similar processing bottlenecks.

Furthermore, a big primitive may not need all four edges evaluated. In the case of large primitives, some edges will be far away from the tile being evaluated and the result of the evaluation will be trivially already known. In such cases, evaluation of two edges will be sufficient.

It is appreciated that embodiments of the present technology are described with reference to primitives having four edges. However, embodiments of the present technology can be applied -to primitives having any number of edges. For example, primitives having six edges may be processed by two edge evaluator circuits in three clock cycles.

Figure 4:
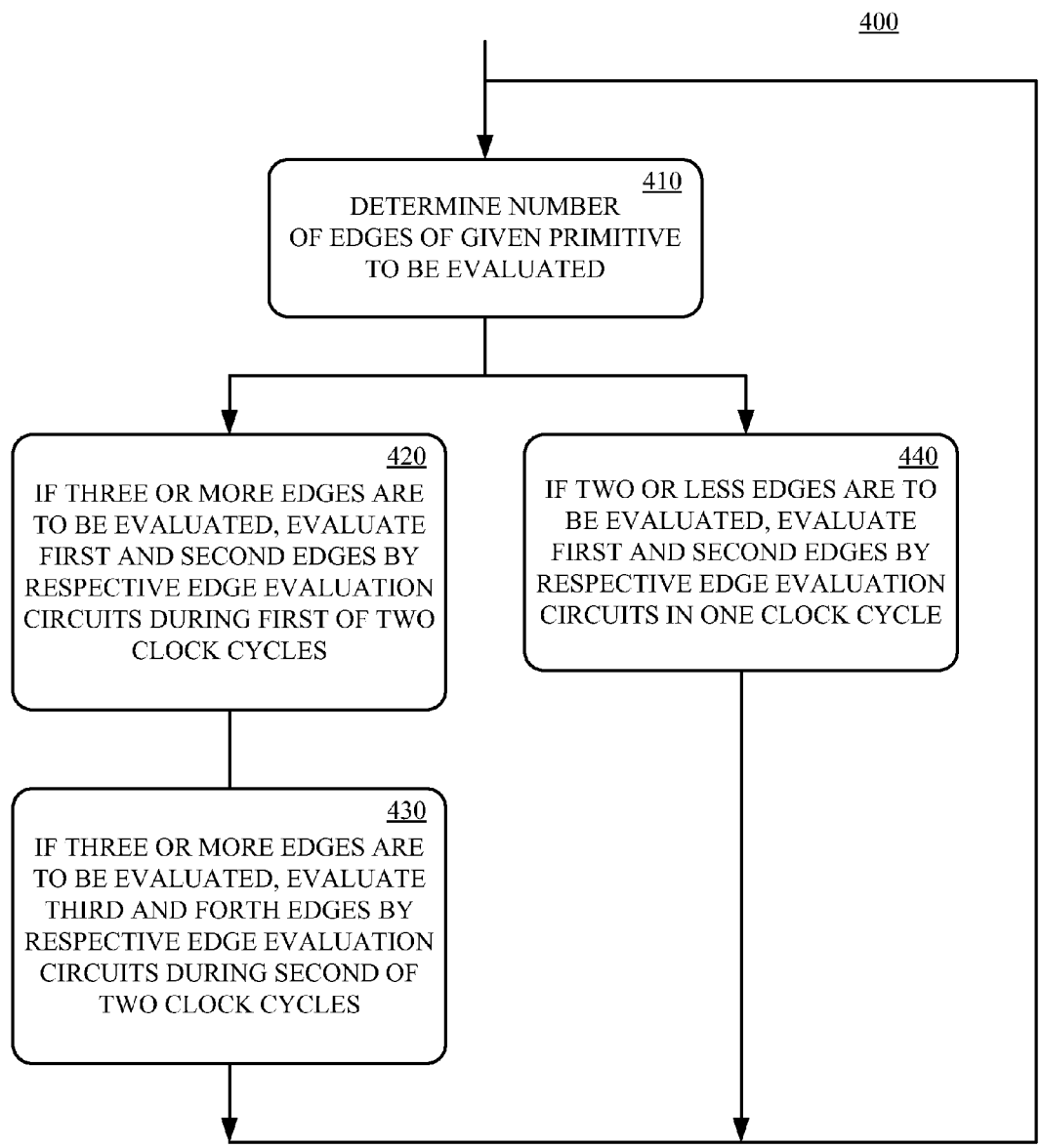
FIG. 4 shows a flow diagram of technique for evaluating edges of a primitive, in accordance with one embodiment of the present technology.
Figure 5:
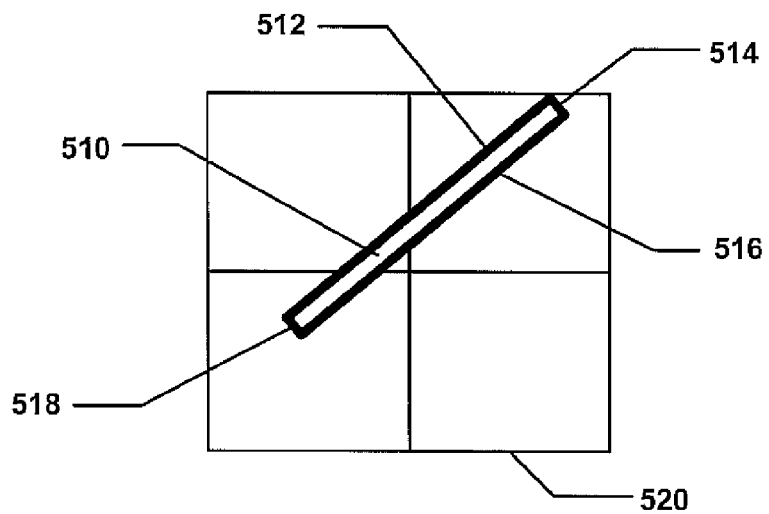
FIG. 5 shows an exemplary primitive and evaluation tile, in accordance with one embodiment of the present technology.
Figure 6:
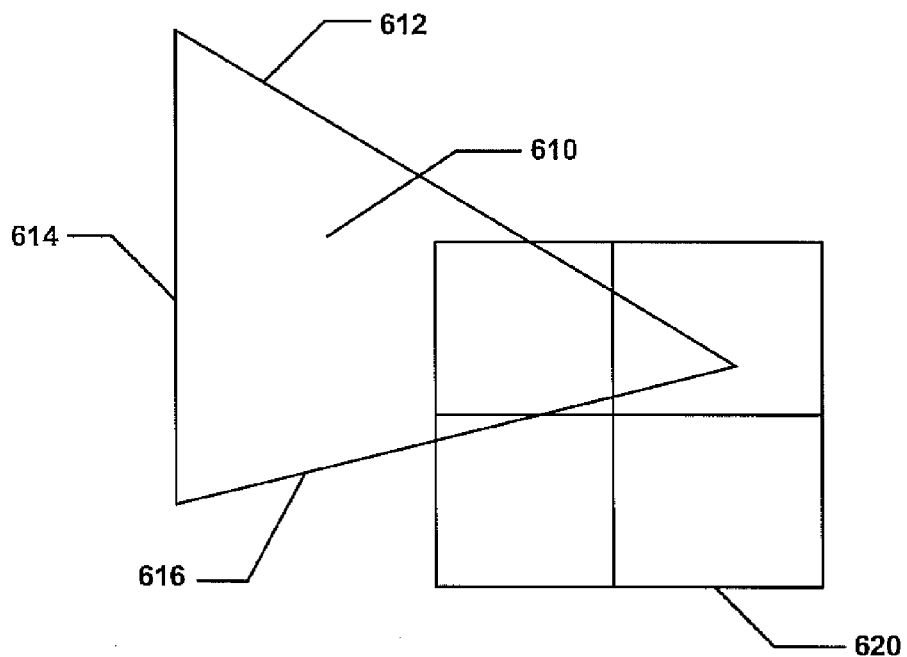
FIG. 6 shows another exemplary primitive and evaluation tile, in accordance with one embodiment of the present technology.

Referring now to FIG. 4, a hardware implemented technique for evaluating edges of a primitive is shown. The method includes determining the number of edges of a primitive to be evaluated, at 410. For example, a rectangular primitive 510, typically used to draw lines, has four edges 512-518 that may need to be evaluated for a given tile 520, as illustrated in FIG. 5. A triangular primitive 610 has three edges 612-616 that may need to be evaluated for a given tile 620, as illustrated in FIG. 6. However, if the primitive is relatively large compared to the evaluation tile 620, one or more of the edges may be trivially known. Therefore, as shown in FIG. 6, only two of the three edges 612, 616 of the triangle primitive 6010 need to be evaluated. The third edge 614 of the triangular primitive 610 in FIG. 6 is trivially known not to be present in any of the pixels of the evaluation tile 620.

If three or more edges of a primitive need to be evaluated, a first edge is evaluated by a first edge evaluation circuit and a second edge is evaluated by a second edge evaluation circuit during a first clock cycle, at 420. A third edge is evaluated by the first edge evaluation circuit and a fourth edge is evaluated by second edge evaluation circuit during a second clock cycle, at 430. The technique then continues at 410 for each primitive to be evaluated.

If two or less edges of the primitive need to be evaluated, a first edge is evaluated by a first edge evaluation circuit and a second edge is evaluated by a second edge evaluation circuit during a first clock cycle, at 440. The technique then continues at 410 for each primitive to be evaluated.

Figure 7:
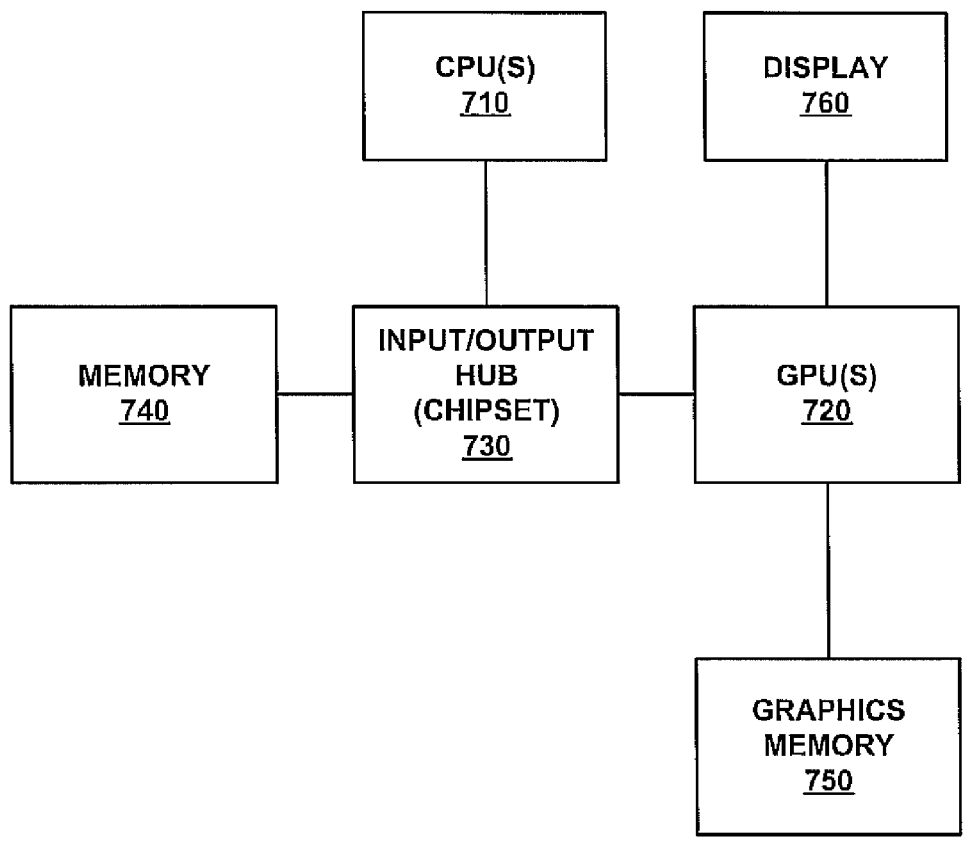
FIG. 7 shows a block diagram of exemplary computing device architecture for implementing embodiments of the present invention.

Referring now to FIG. 7, an exemplary computing device 700 for implementing embodiments of the present invention is shown. The computing device 700 may be a personal computer, server computer, client computer, laptop computer, game console, hand-held device, minicomputer, mainframe computer, distributed computer system, embedded computer, system on a chip, or the like. In addition to standard computers, the computing device may be used to implement car dashboards, kiosks, pachinko machines, slot machines, television sets, industrial controls, medical devices, wearable devices embedded in clothing, eyeglasses or wristbands, and other such applications. The computing device 700 includes one or more central processing units (-CPU) 710, one or more graphics processing units (GPU) 720, an input/output hub 730, one or more computing device-readable media 740, 750, a display device 760, and one or more other input/output (I/O) devices (not shown). The additional I/O devices may include a network adapter (e.g., Ethernet card), CD drive, DVD drive a keyboard, a pointing device, a speaker, a printer, cameras, biosensors, proximity sensors, chemical substance detectors, haptic sensor/effectors (touch/feeling devices), and/or the like.

The computing device-readable media 740, 750 may be characterized as primary memory and secondary memory. Generally, the secondary memory, such as a magnetic and/or optical storage, provides for non-volatile storage of computer-readable instructions and data for use by the computing device 700. For instance, a disk drive may store the operating system (OS) and applications and data. The primary memory, such as system memory and/or graphics memory 750, provides for volatile storage of computer-readable instructions and data for use by the computing device 700. For instance, the system memory may temporarily store a portion of the operating system and a portion of one or more applications and associated data that are currently used by the CPU 710, GPU 720 and the like.

The computing device-readable media 740, 750, I/O devices 760, and GPU 720 may be communicatively coupled to the processor 710 by the input/output hub 730 and one or more busses. The input/output hub 730 may be a simple hub or a chip set, such as a northbridge and southbridge. The input/output hub 730 provides for communication of data and instructions between the processor 710 and the computing device-readable media 740, 750, I/O devices 760, and GPU 720. In the case of a northbridge/southbridge chip set, the northbridge 170 provides for communication with the processors 710, 720 and interaction with the system memory. The southbridge 175 provides for general input/output functions.

Figure 1:
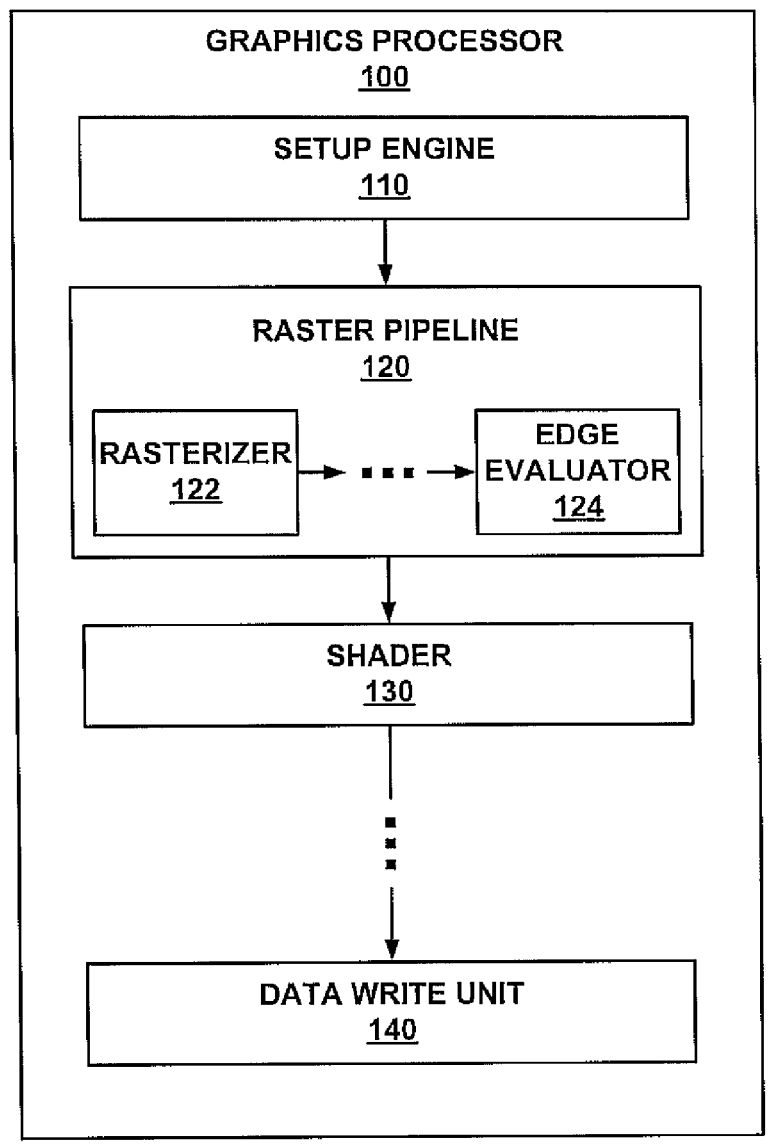
FIG. 1 shows a block diagram of an exemplary graphics processing unit.
Figure 2:
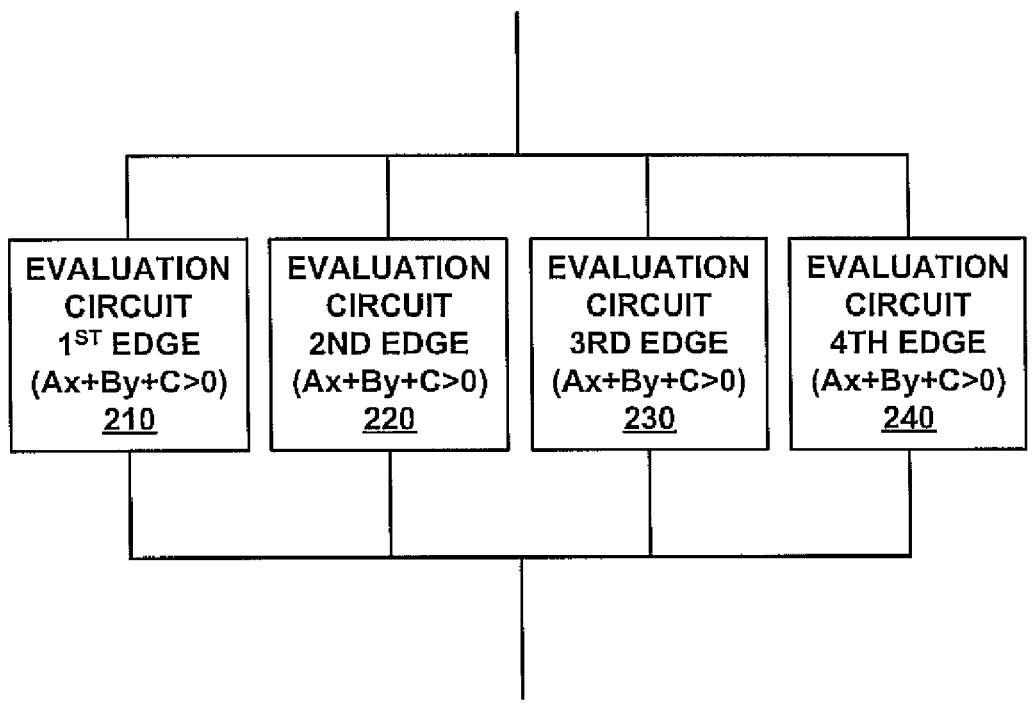
FIG. 2 shows a block diagram of an edge evaluator according to the conventional art.

The GPU 720 may include a setup engine, a raster pipeline, a shading pipeline, a data write unit, and one or more other units, as illustrated and described with reference to FIG. 1. The raster pipeline of the GPU 270 includes an edge evaluator, as illustrated and described with reference to FIGS. 3 and 4. The edge evaluator determines the number of edges of a given primitive to be evaluated. The edge evaluator evaluates the first edge by a first edge evaluation circuit and the second edge by a second edge evaluation circuit during a first clock cycle. If three or more edges are to be evaluated, the edge evaluator also sequences evaluation, during a second clock cycle, of the third edge by the first edge evaluation circuit and if necessary the fourth edge by the second edge evaluation circuit.

Embodiments of the present technology advantageously reduce the gate count of the edge evaluation portion of the graphics processing unit and thus consumes less area on the integrated circuit die. The edge evaluator containing two edge evaluation circuits in accordance with embodiment of the present technology also consumes less power than conventional edge evaluators containing four edge evaluation circuits. Embodiments of the present technology also do not appreciably reduce performance of the graphics processing circuit because one or more other circuits in the graphics processing unit are dominant performance bottlenecks.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the Claims appended hereto and their equivalents.

What is claimed is:

1. A graphics processing unit comprising:
   two edge evaluation circuits; and
   a sequencer, coupled to the two edge evaluation circuits, including;
   a plurality of buffers; and
   a multiplexor, coupled between the plurality of buffers and the two edge evaluation circuits, to input from the plurality of buffers a first edge of a given primitive to a first of the two edge evaluation circuits and a second edge of the given primitive to a second of the two edge evaluation circuits in parallel with the first edge, and to input from the plurality of buffers a third edge of a given primitive to the first of the two edge evaluation circuits and a third edge of the given primitive to the second of the two edge evaluation circuits in parallel with the third edge and wherein the third and fourth edges are input in series to the first and second edges if the given primitive includes three or more edges.

2. The graphics processing unit of claim 1, wherein each edge evaluation circuit computes an edge equation for a given edge.

3. The graphics processing unit of claim 1, wherein each edge evaluation circuit computes an edge equation for an evaluation tile.

4. The graphics processing unit of claim 1, wherein the two edge evaluation circuits are coupled in parallel with each other to the sequencer.

5. The graphics processing unit of claim 1, wherein the first and second edges are input during a first clock cycle.

6. The graphics processing unit of claim 1, wherein if the given primitive includes three or more edges the third and fourth edges are input during a second clock cycle.

7. The graphics processing unit of claim 1, wherein the sequencer consumes less power than the two edge evaluation circuits.

8. The graphics processing unit of claim 1, wherein the sequencer consumes less area on an integrated circuit die than the two edge evaluation circuits.

9. The graphics processing unit of claim 1, wherein the two edge evaluation circuits are larger circuits than the sequencer.

10. An edge evaluation method comprising:
    buffering a plurality of edges of a given primitive;
    determining a number of edges of the given primitive to be evaluated;
    multiplexing a buffered first edge and a buffered second edge of the given primitive in parallel to a first edge evaluation circuit and a second edge evaluation circuit respectively, and sequentially multiplexing a buffered third edge and a buffered fourth edge of the given primitive in parallel to the first edge evaluation circuit and the second edge evaluation circuit respectively;
    evaluating in parallel the first edge by the first edge evaluation circuit and the second edge of the given by the second edge evaluation circuit and sequentially evaluating in parallel the third edge by the first edge evaluation circuit and the fourth edge by the second edge evaluation circuit if three or more edges are to be evaluated; and
    evaluating in parallel the first edge by the first edge evaluation circuit and the second edge by a second edge evaluation circuit if two or less edges are to be evaluated.

11. The method according to claim 10, wherein evaluating each edge comprises computing an edge equation for each edge.

12. The method according to claim 11, wherein the edge equation is computed for a given evaluation tile.

13. The method according to claim 10, wherein a given edge is not evaluated if it is trivially already known.

14. A method comprising:
    buffering a plurality of edges of a given primitive to be evaluated;

determining a number of edges of the given primitive to be evaluated;
multiplexing a buffered first edge to a first edge evaluation circuit and a buffered second edge to a second edge evaluation circuit during a first clock cycle; and
multiplexing a buffered third edge to the first edge evaluation circuit and a buffered fourth edge to the second edge evaluation circuit during a second clock cycle if three or more edges are to be evaluated.

15. The method according to claim 14, wherein each edge evaluation circuit computes an edge equation.

16. The method according to claim 15, wherein the edge equation is computed for a given evaluation tile.

17. The method according to claim 14, wherein a given edge is not evaluated if it is trivially already known.

* * * * *